United States Patent [19]

Tomosada et al.

[11] Patent Number: 5,439,244
[45] Date of Patent: Aug. 8, 1995

[54] SUSPENSION APPARATUS FOR AN AUTOMOTIVE VEHICLE

[75] Inventors: Kenji Tomosada; Fumitaka Ando; Toshiro Kondo; Takao Imada, all of Hiroshima, Japan

[73] Assignee: Mazda Motor Corporation, Hiroshima, Japan

[21] Appl. No.: 9,753

[22] Filed: Jan. 27, 1993

[30] Foreign Application Priority Data

Jan. 28, 1992 [JP] Japan .................. 4-037195
Jan. 28, 1992 [JP] Japan .................. 4-037196
Jan. 28, 1992 [JP] Japan .................. 4-037197

[51] Int. Cl.⁶ ............................................. B60G 3/00
[52] U.S. Cl. .................................. 280/691; 280/673
[58] Field of Search ............... 280/660, 663, 666, 667, 280/675, 690, 691, 673

[56] References Cited

U.S. PATENT DOCUMENTS

| | | | |
|---|---|---|---|
| 4,145,072 | 3/1979 | Matschinsky | 280/668 |
| 4,744,586 | 5/1988 | Shibahata et al. | 280/691 |
| 5,098,116 | 3/1992 | Edahiro et al. | 280/675 |
| 5,098,118 | 3/1992 | Hayashi et al. | 280/691 |

FOREIGN PATENT DOCUMENTS 58-42042 9/1983 Japan .

*Primary Examiner*—Margaret A. Focarino
*Assistant Examiner*—Paul N. Dickson
*Attorney, Agent, or Firm*—Fish & Richardson

[57] ABSTRACT

An intersection of an extension of a front lower arm with an extension of a rear lower arm outside a transversely outer side constitutes a lower set point of a virtual kingpin axis. The transversely inner end portion of one lower arm of the front lower arm and the rear lower arm is connected to the body of the vehicle so as to be capable of being displaced in the longitudinal direction of the body. When the wheel is steered, the transversely outer end portion of the lower arm for the externally cornering wheel is displaced rearward while it pivots rearward about the transversely inner end portion of the lower arm, and the rearward displacement is transmitted so as to displace the transversely inner end portion of the one lower arm through a control link. The control link may be divided into two elements.

32 Claims, 19 Drawing Sheets

SUSPENSION APPARATUS FOR AN AUTOMOTIVE VEHICLE

BACKGROUND OF THE INVENTION

1. Field of the Invention

The present invention relates to a suspension apparatus for an automotive vehicle.

2. Description of the Related art

A member for supporting a steering wheel, that is, a knuckle, is supported to the body of the vehicle at least through a lower arm so as to be pivotable in vertical directions. The wheel to be mounted to the member for supporting the wheel is required to be aligned in a predetermined way, and one of the significant factors for determining the alignment of the wheel is a kingpin axis.

The kingpin axis is arranged in such a manner that, when the body of the vehicle is viewed from its front side or its rear side, an intersection of the downward extension of the virtual kingpin axis with the road surface with which the wheel is in contact exists the position to some extent outside an intersection of the transversely central line of the wheel with the road surface. It is further preferred that the wheel be toed in. In addition, it is desired that an intersection of the virtual kingpin axis with a horizontal extension from the rotational center of the wheel be located in the position to some extent inside the body from the rotational center of the transversely central line of the wheel and the wheel is toed in when driving force is applied. Such settings are strongly required particularly for a front suspension of a front wheel drive car having an engine capable of generating a large degree of torque.

As is understood from the foregoing description, it is required that the kingpin axis is set so as to be inclined to some extent toward the outside of the body as it extends downward, when the body of the vehicle is viewed from its front side. For instance, for a strut type suspension, the portion of connection between the lower arm and the member for supporting the wheel constitutes a lower set point and the portion of connection between a suspension damper and the member for supporting the wheel constitutes an upper set point. Further, the line connecting the lower set point to the upper set point is set as a kingpin axis.

In order to satisfy the requirements for inclination of the kingpin axis in the manner as described hereinabove, it is necessary to extend the lower set point, i.e. the transversely outer end portion of the lower arm, into the long depth of the inner radial portion of the wheel, that is, towards the transversely outer side. It is difficult, however, to extend the lower arm to a great extent toward the outside in the transversely circumferential direction from the point of view of prevention of the interference with brake disks, and so on.

A suspension of a so-called double pivot type is proposed in Japanese Patent Examined Publication No. 5842,042 or its U.S. counterpart, i.e. U.S. Pat. No. 4,145,072, in which the lower arm is divided into a front lower arm and a rear lower arm to thereby provide two connections of the member for supporting the wheel to the front lower arm and to the rear lower arm, in order to locate the lower set point of the kingpin axis in the position toward the transversely outer side of the body. In other words, the proposed suspension is structured in such a manner that the lower set point of the virtual kingpin axis is constituted by an intersection formed by the axial extension of the front lower arm and the rear lower arm toward the transversely outer side of the body. More specifically, a phantom line connecting the connecting portion of the front lower arm at the side of the body to the connecting portion thereof at the side of the wheel-supporting member intersects with a phantom line connecting the connecting portion of the rear lower arm at the side of the body to the connecting portion thereof at the side of the wheel-supporting member, and the point of the intersection is substantially set as the lower set point of the virtual kingpin axis by locating the resulting intersection between the two phantom lines in the position at the side of the transversely outer end portion from the connecting portion between each lower arm and the member for supporting the wheel.

When the virtual kingpin axis is constituted by the division of the lower arm into the front lower arm and the rear lower arm, however, this system may present the problem that the ability of returning the steering wheel becomes poor, when the wheel is steered, because of the small castor trail of the externally cornering wheel, i.e. the wheel located at the outer side of cornering.

More specifically, as the steering wheel is steered, the externally cornering wheel is steered in a moment about the virtual kingpin axis that was set when the wheel was in a straight forward state. At this time of steering, the connecting portion of each of the front lower arm and the rear lower arm to the member for supporting the wheel is displaced relatively rearward as compared with the straight forward state of the wheel, thereby causing each of the lower arms to pivot toward the rear side of the body of the vehicle and displacing the lower set point of the virtual kingpin axis in the rearward direction. As a result, the castor trail of the externally cornering wheel becomes smaller so that the ability of returning the steering wheel becomes poor. In particular, as the externally cornering wheel functions as the wheel for substantially governing the return of the steering wheel by migration of the load of the body of the vehicle, the returnability of the steering wheel becomes considerably poor during driving at a high speed and a large steered angle, such as during sport running In extreme cases, the situation may arise where the wheels are steered to an extent larger than intended.

SUMMARY OF THE INVENTION

Therefore, the object of the present invention is to provide a suspension apparatus for an automotive vehicle, so adapted as to suppress the ability of returning the steering wheel from worsening, in which the front lower arm and the rear lower arm are so structured as to constitute a lower set point of the virtual kingpin axis.

In order to achieve the aforesaid object, the present invention consists of a suspension apparatus for an automotive vehicle having a member for supporting a steering wheel mounted to a body of the vehicle through a front lower arm and a rear lower arm so as to be pivotable in a vertical direction and having a lower set point of a virtual kingpin axis constituted by an intersection of an extension of said front lower arm in an outer direction of the body with an extension of said rear lower arm in the outer direction thereof, wherein:

a transversely inner end portion of one lower arm of said front lower arm and said rear lower arm is connected to the body of the vehicle so as to be capable of being displaced in a longitudinal direction of the body; and a control link is provided so as to convert a rearward displacement of a transversely outer end portion of said front lower arm or a transversely outer end portion of said rear lower arm into an external force for displacing a transversely inner end portion of the one lower arm, said rearward displacement occurring at an externally cornering wheel when the wheel is steered.

With the arrangement as described hereinabove, when the wheel is steered, the transversely outer end portions of the front and rear lower arms for the externally cornering wheel are displaced rearward, and the rearward displacement is converted into the force for displacing the transversely inner end portion of one of the lower arms by the control link. More specifically, when the steering wheel is steered, the transversely outer end portion of each of the front lower arm and the rear lower arm for the externally cornering wheel is caused to be displaced rearward by the rearward pivotal movement of the transversely inner end portion of each of the front lower arm and the rear lower arm. When the transversely inner end portion of one of the lower arms is displaced rearward, the amount of the rearward displacement of the lower set point of the virtual kingpin axis, that is, the amount of the decrease in the castor trail, becomes relatively small as compared with the case where the transversely inner end portion of the lower arm is not displaced.

Other objects, features and advantages of the present invention will become apparent during the course of the description of the preferred embodiments, which follows, with reference to the accompanying drawings

DETAILED DESCRIPTION OF THE PREFERRED EMBODIMENTS

The present invention will be described in detail by way of examples with reference to the accompanying drawings. A description will be made of the embodiments of the present invention, in which the suspension apparatus according to the present invention is applied for the front suspension of the front wheel drive car.

First Embodiment (FIGS. 1-8)

As shown in FIGS. 1 to 4, the suspension apparatus according to the present invention comprises a front lower arm 1, a rear lower arm 2, and a suspension damper 3.

Figure 1:
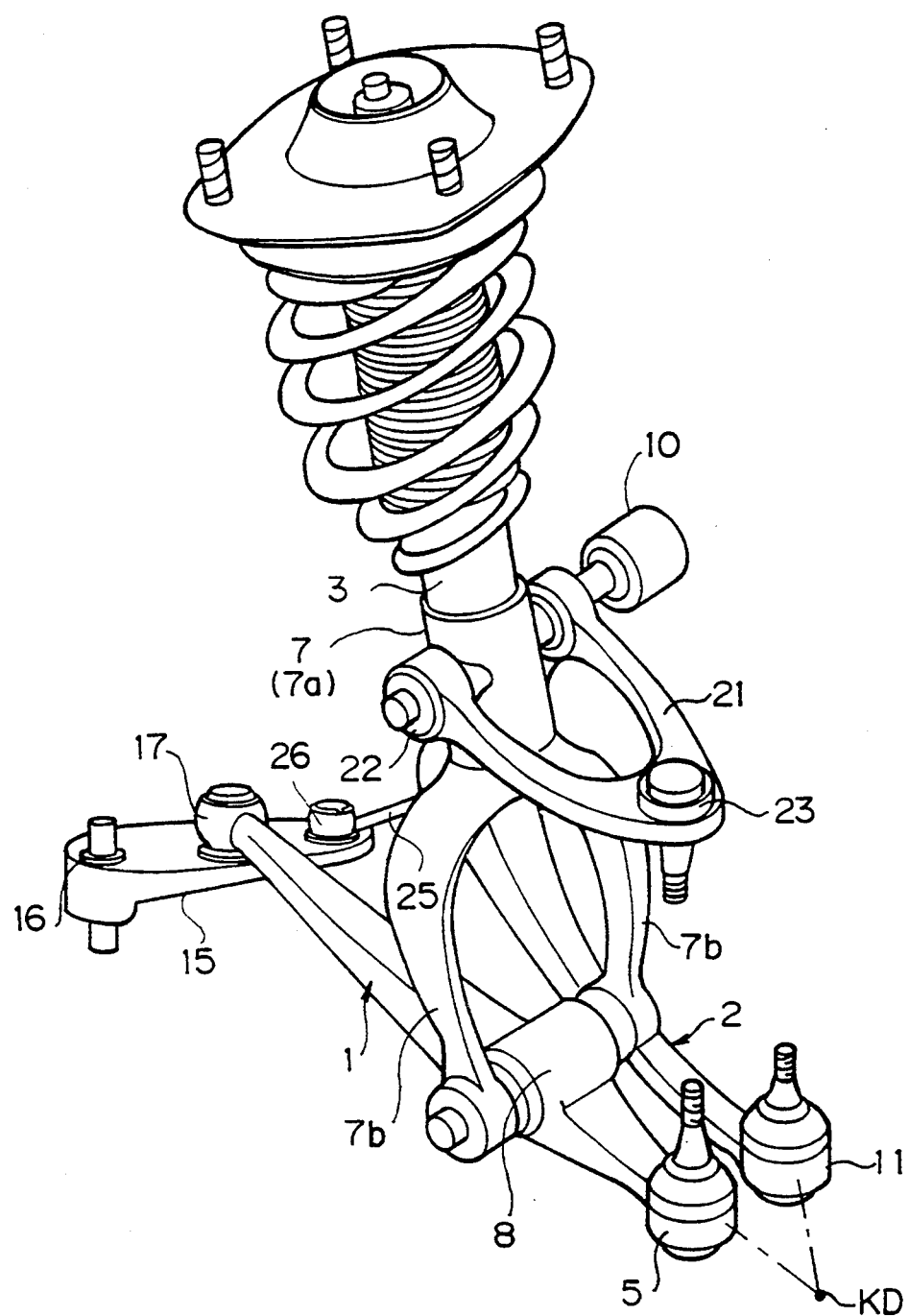
FIG. 1 is a perspective view showing an entire structure of the suspension apparatus in a first embodiment according to the present invention.
Figure 2:
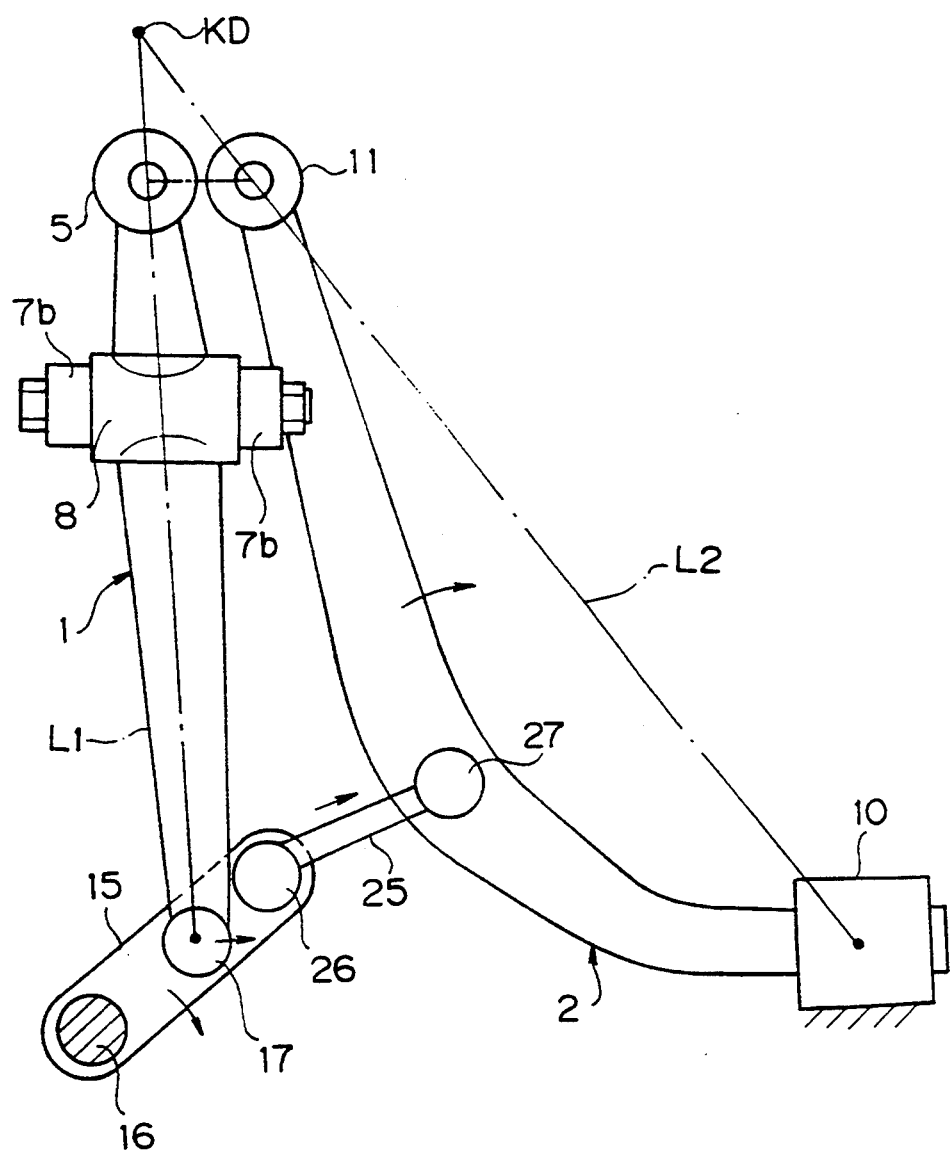
FIG. 2 is a plan view showing a front lower arm portion and a rear lower arm portion as shown in FIG. 1.

As shown in FIGS. 1 and 2, the front lower arm 1 is disposed extending in a generally horizontal and transverse direction, and a transversely inner end portion of the front lower arm 1 is connected to the body of the vehicle through a sublink 15 extending in a generally horizontal direction. The sublink 15 is in turn mounted through a bush 16 to the body of the vehicle so as to be pivotable in a generally horizontal direction, and the transversely inner end portion of the front lower arm 1 is mounted to a middle portion of the sublink 15 through a ball joint 17, as also described specifically in Fig. 5.

As shown specifically in FIG. 2, the center of the pivotal movement of the sublink 15 is located in the position before the front lower arm 1, and the sublink 15 is disposed so as to be inclined gradually toward a transversely outer direction as the sublink 15 extends toward the rear of the body. The transversely inner end portion of the front lower arm 1 is displaced toward the rear of the body when the sublink 15 is caused to pivot in the clockwise direction from the state as shown in Fig. 2.

On the other hand, a transversely outer end portion of the front lower arm 1 is mounted through a ball joint 5 to the lower end portion of a knuckle 6 serving as a member for supporting a wheel.

To the middle portion of the front lower arm 1 is mounted the lower end portion of the suspension damper 3 through a mounting member 7 that comprises a cylindrical section 7a and a pair of leg sections 7b, the cylindrical section 7 disposed so as to be engaged with an outer circumference of the lower end portion of the suspension damper 3 and the leg sections 3 formed by branching the cylindrical section 7a into two sections from the lower end portion thereof in longitudinal directions of the body. The leg sections 7b are connected to the front lower arm 1 through a bush 8 in such a state that the pair of the leg sections 7b are disposed astride the front and rear sides of the front lower arm 1. The bush 8 is so disposed as for the suspension damper 3 to be pivotable about the axis extending in the generally longitudinal direction of the body and to be slidable to some extent in the longitudinal direction thereof, with respect to the front lower arm 1.

A drive shaft, although not shown, is disposed to penetrate over the entire length of the space formed between the pair of the leg sections 7b. The use of the upper arm 21 provides a larger degree of freedom for the control of the camber of the wheel, as compared with a general type strut suspension wherein the suspension damper 3 is connected directly to the member 6 for supporting the wheel.

The rear lower arm 2 is arranged in a generally L-shaped form as shown in FIG. 2. The transversely inner end portion of the rear lower arm 2 extends in a generally horizontal and longitudinal direction of the body and it is connected through a bush 10 to the body of the vehicle so as to be pivotable in vertical directions. Further, the rear lower arm 2 is arranged in such a shape that it is inclined gradually to some extent toward the front side of the body as the portion of the rear lower arm 2 extends from its middle portion toward its transversely outer side. The transversely outer end portion of the rear lower arm 2 is connected to the lower end portion of the knuckle 6 through a ball joint 11 that is located in the position immediately behind the ball joint 5 for the front lower arm 1.

As shown in FIG. 1, the mounting member 7 for the suspension damper 3 is connected to the upper end portion of the knuckle 6 through an upper arm 21 which is arranged in a generally U-shaped form having an opening directed toward the inside of the body. The upper arm 21 is disposed in such a state that the two end arm sections of the U-shaped upper arm 21 are mounted to the mounting member 7 astride its both front and rear sides and the upper arm 21 is disposed so as to pivot on the bush 22 in vertical directions, that is, so as to pivot about the axis of the bush 22 extending in the generally longitudinal direction of the body. The transversely outer end portion of the upper arm 21 is connected to the upper end portion of the knuckle 6 through a ball joint 23. The upper arm 21 is set to be transversely sufficiently short as compared with that of each of the lower arms 1 and 2.

As shown in FIG. 2, a phantom line L1 is set so as to connect the center of the ball joint 17 for the front lower arm 1 to the center of the ball joint 5 therefor, and a phantom line L2 is set so as to connect the center of the bush 10 for the rear lower arm 2 to the center of the ball joint 11 therefor. The phantom line L1 intersects with the phantom line L2 on the transversely outer side of both of the ball joints 5 and 11, and the intersection KD between the phantom line L1 and the phantom line L2 is indicated by reference symbol KD.

Figure 3:
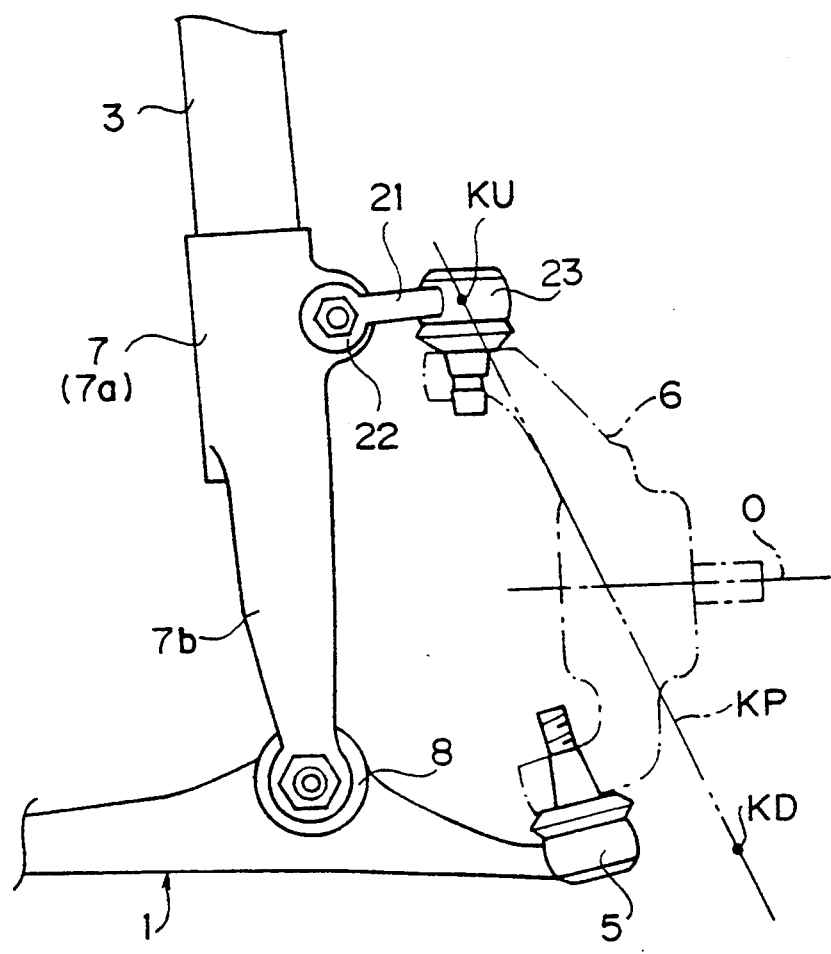
FIG. 3 is a rear view showing the front lower arm portion of FIG. 1, when viewed from behind.
Figure 4:
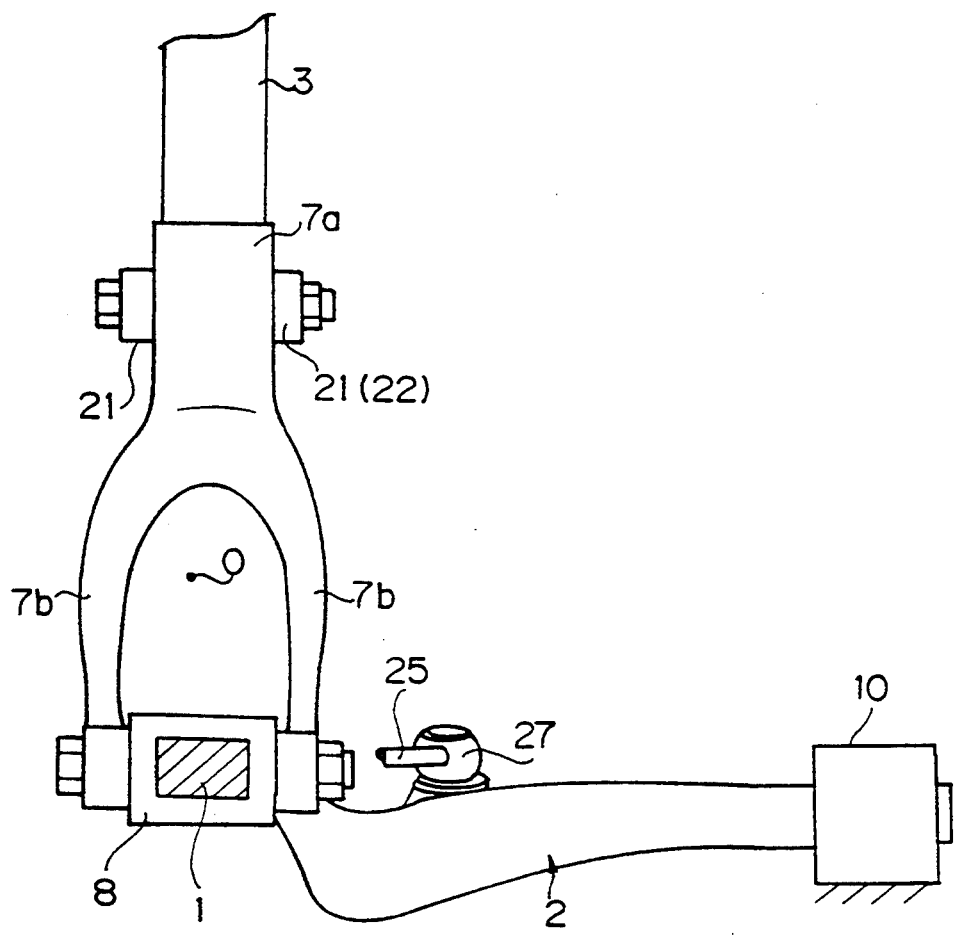
FIG. 4 is a partial sectional side view showing the front lower arm and rear lower arm portions of FIG. 1, when viewed from the inside of the body.
Figure 5:
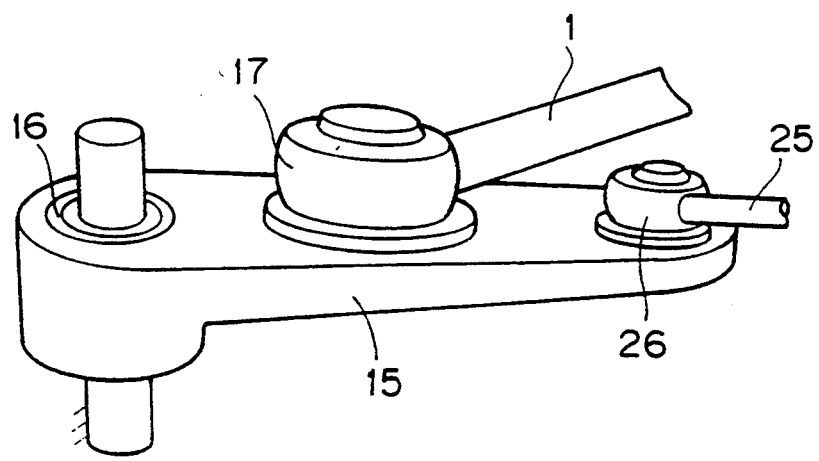
FIG. 5 is an enlarged view showing the detail of a sublink portion to which a transversely inner end portion of the front lower arm of FIG. 1 is mounted.

Then, as shown in FIG. 3, a phantom line connecting the intersection KD to the center KU of the ball joint 23 for the upper arm 21 constitutes a virtual king pin axis KP. In other words, the center of the ball joint 23 constitutes an upper set point for the virtual kingpin axis KP while the intersection KD constitutes a lower set point for the virtual kingpin axis KP.

The middle portion of the rear lower arm 2 is connected to the end portion of the sublink 15 through a connecting link 25. In other words, one end portion of the connecting link 25 is connected to the sublink 15 through a ball joint 26, while the other end portion of the connecting link 25 is connected to the middle portion of the rear lower arm 2 through a ball joint 27. The connecting link 25 extends in a generally horizontal direction and it is gradually inclined to some extent toward the transversely outer side as it extends in a rearward direction.

Further, the connecting link 25 is so arranged as to transmit the rearward pivotal movement of the rear lower arm 2 about the bush 10 so as to provide the sublink 15 with a pivotal movement in the clockwise direction in FIG. 2. In other words, the connecting link 25 is to displace the transversely inner end portion of the front lower arm 1 in a rearward direction of the body. In brief, the positions of the intersections 16, 17, 26, and 27 as well as the length and the inclination of the links 15 and 25 are set so as to effectively transmit such force. As described hereinabove, in this embodiment, the sublink 15 and the connecting link 25 comprise a control link.

Figure 6:
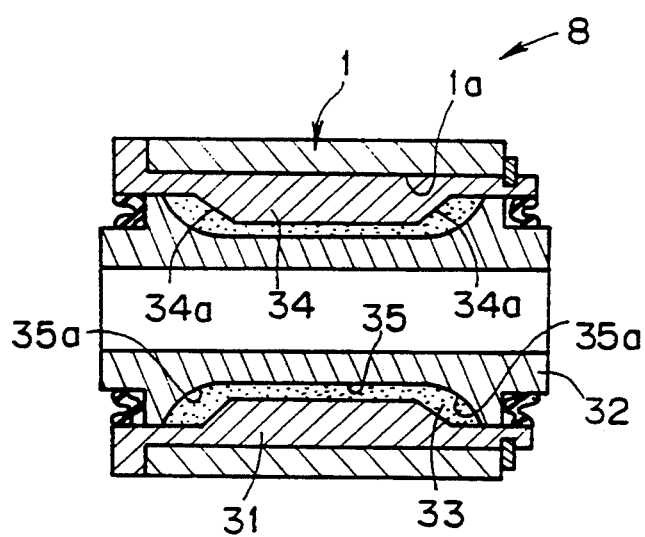
FIG. 6 is a cross sectional view showing an example of a bush to be employed for a connecting portion between the suspension damper and the front lower arm as shown in Fig. 1.

As shown in FIG. 6, the bush 8 comprises an outer cylinder 31, an inner cylinder 32, and an elastic member 33, such as rubbery material. The outer cylinder 31 is arranged so as to be inserted into a mounting hole 1a of the front lower arm 1, the inner cylinder 32 is arranged in such a manner that a shaft to which the leg sections 7b are mounted is inserted, and the elastic member 33 is filled in a clearance between the cylinders 31 and 32.

On an inner circumferential surface of the outer cylinder 31 is formed a projection 34 extending in an axial direction, and the axial stroke end portion of the projection 34 is so arranged as to be gradually lowered as it extends toward its axial end portion to provide an inclined face 34a. On the other hand, an outer circumferential surface of the inner cylinder 32 is provided with an concave portion 35 extending in an axial direction, and the axial stroke end portion of the concave portion 35 constitutes an arc face 35a which is disposed facing the inclined face 34a. In this embodiment, each of the projection 34 and the concave portion 35 extends over the entire length in the circumferential direction of the bush 8.

The bush 8 is structured in such a manner that each of the outer cylinder 31 and the inner cylinder 32 allows some relative pivotal movement about the axis thereof and a relative displacement in the axial direction within a range of the axial distances between the inclined face 34a, set to be comparatively large, and the arc face 35a.

Then, a description will be made of the action of the present invention with reference to FIGS. 7 and 8.

Figure 7:
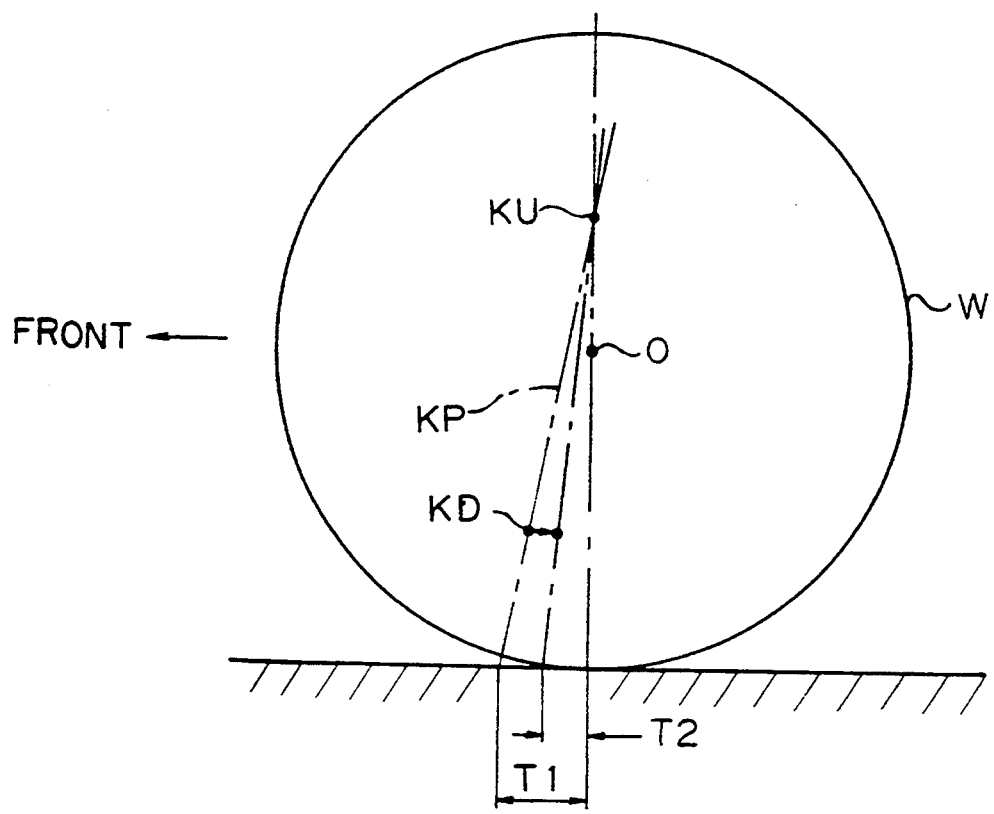
FIG. 7 is a schematic representation for describing an influence of the rearward displacement of the lower set point of a virtual kingpin axis upon a variation in a castor trail.

As shown in FIG. 7, when the wheel W is viewed from the outside of the body of the vehicle, the virtual kingpin axis KP is set to be inclined forward as it extends downward, and a castor trail can be indicated by reference symbol T1 when the wheel W is in a straight forward state.

If the upper set point KD of the virtual kingpin axis KP would be displaced rearward in such a state that the upper set point KU thereof is not displaced, the castor trail becomes so smaller, as indicated by reference symbol T2, that the ability of returning the steering wheel becomes poor when it is steered.

Figure 8:
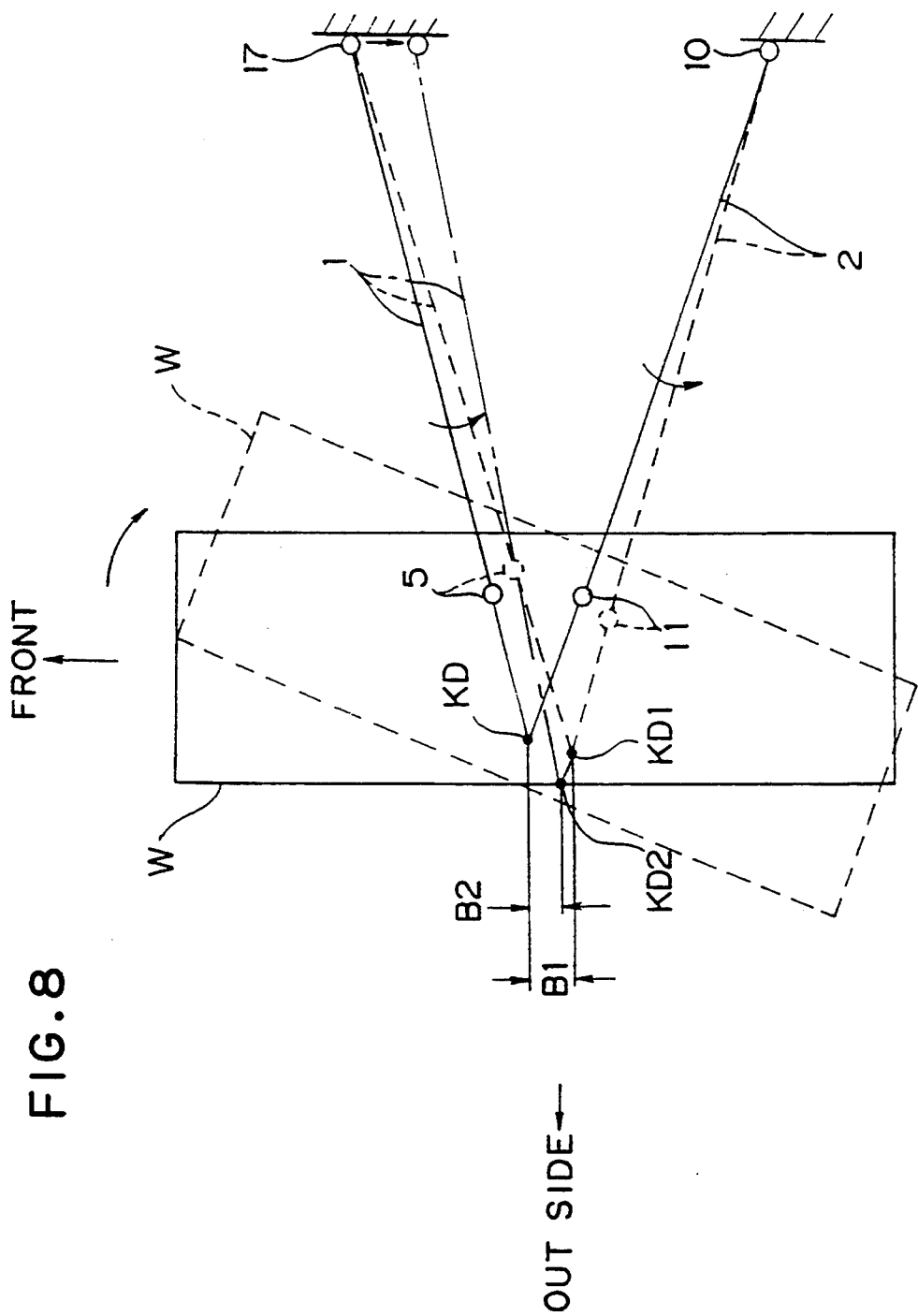
FIG. 8 is a schematic representation for describing the action by the suspension apparatus in the first embodiment according to the present invention, as compared with the action by the conventional suspension apparatus.

In FIG. 8, the states of the wheel W and the lower arms 1 and 2 are indicated by solid line when the wheel W is in a straight forward state, and the lower set point of the virtual kingpin axis KP is indicated by reference symbol KD, although it should be understood that FIG. 8 is represented in an exaggerated fashion.

When the wheel W is steered from its straight forward state and it is located at the outer side during cornering, the state of the wheel W is indicated by broken line in FIG. 8. During steering, the wheel W is steered about the virtual kingpin axis KP in the straight forward state and, as a result, the positions of connection of each of the lower arms 1 and 2 to the knuckle 6, that is, the ball joints 5 and 11, respectively, are allowed to move rearward.

Further, in FIG. 8, the states of the lower arms 1 and 2 are indicated by broken lines, when each of the lower arms 1 and 2 pivots rearward on the connecting portion at the side of the body when the ball joints 5 and 11 move rearward. The lower set point of the virtual kingpin axis at this time can be indicated by reference symbol KD1, and it is displaced rearward by B1 from the original lower set point KD, thereby making the castor trail considerably smaller. It should be noted herein that the state in which each of the lower arms 1 and 2 is displaced rearward to the lower set point KD1 is the same as in a conventional case.

On the other hand, in the case of the present invention, the front lower arm 1 of the wheel W located at the outer side of cornering during steering is displaced in such a way as indicated by dot-and-dash line in FIG. 8. In other words, when the transversely inner end portion of the front lower arm 1 is displaced rearward, the lower set point of the virtual kingpin axis KP can be indicated by reference symbol KD2, and it is displaced rearward by B2 from the original lower set point KD yet the amount of displacement indicated by reference symbol B2 is smaller than the amount of displacement indicated by reference symbol B1 (B1>B2). In other words, the embodiment of the present invention can control a decrease in the castor trail to a smaller extent, thereby preventing the return of the steering wheel from becoming worsened when the steering wheel is steered.

Figure 9:
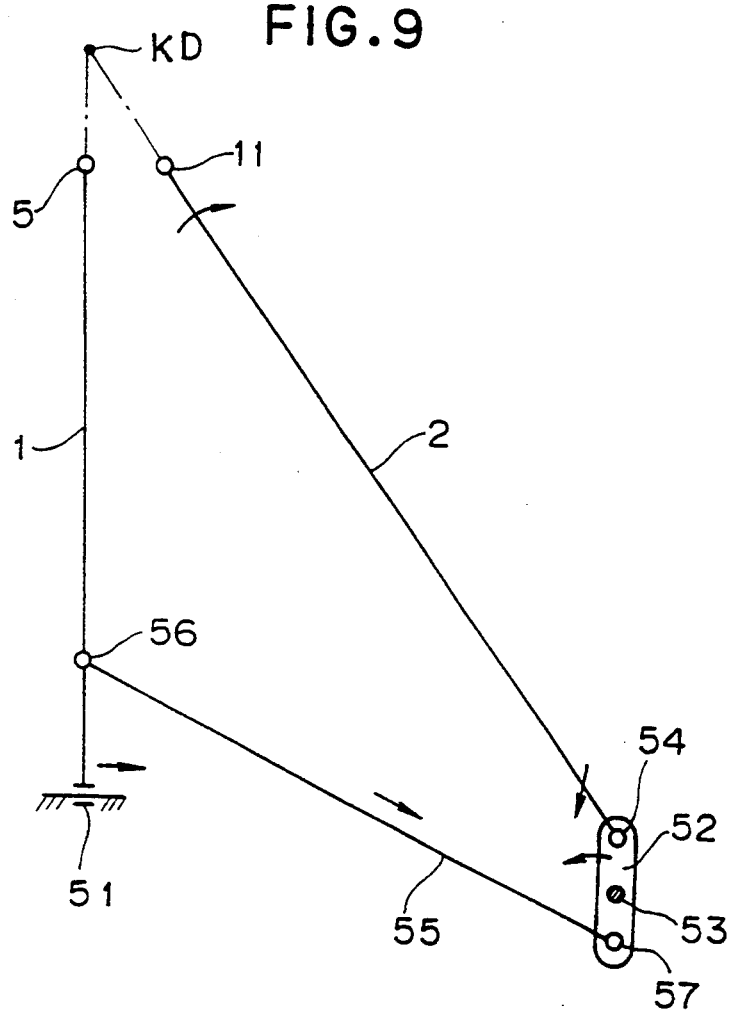
FIG. 9 is a skeletal view showing a second embodiment of the suspension apparatus according to the present invention, corresponding to Fig.
Figure 10:
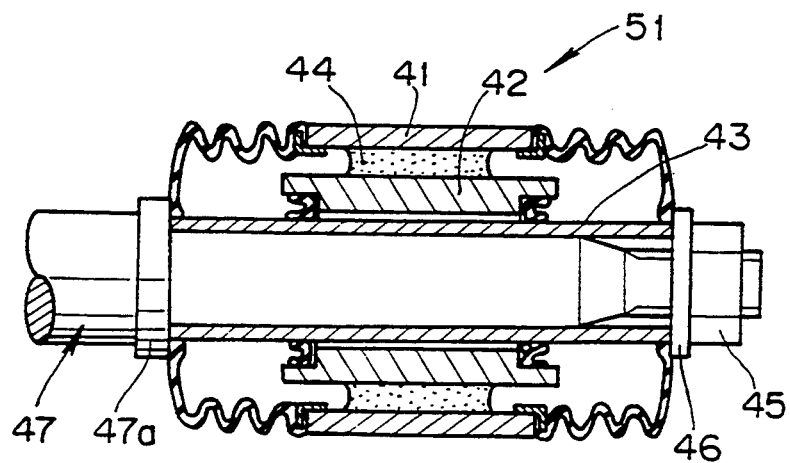
FIG. 10 is a cross sectional view showing an example of a slidable bush to be employed in FIG. 9.
Figure 11:
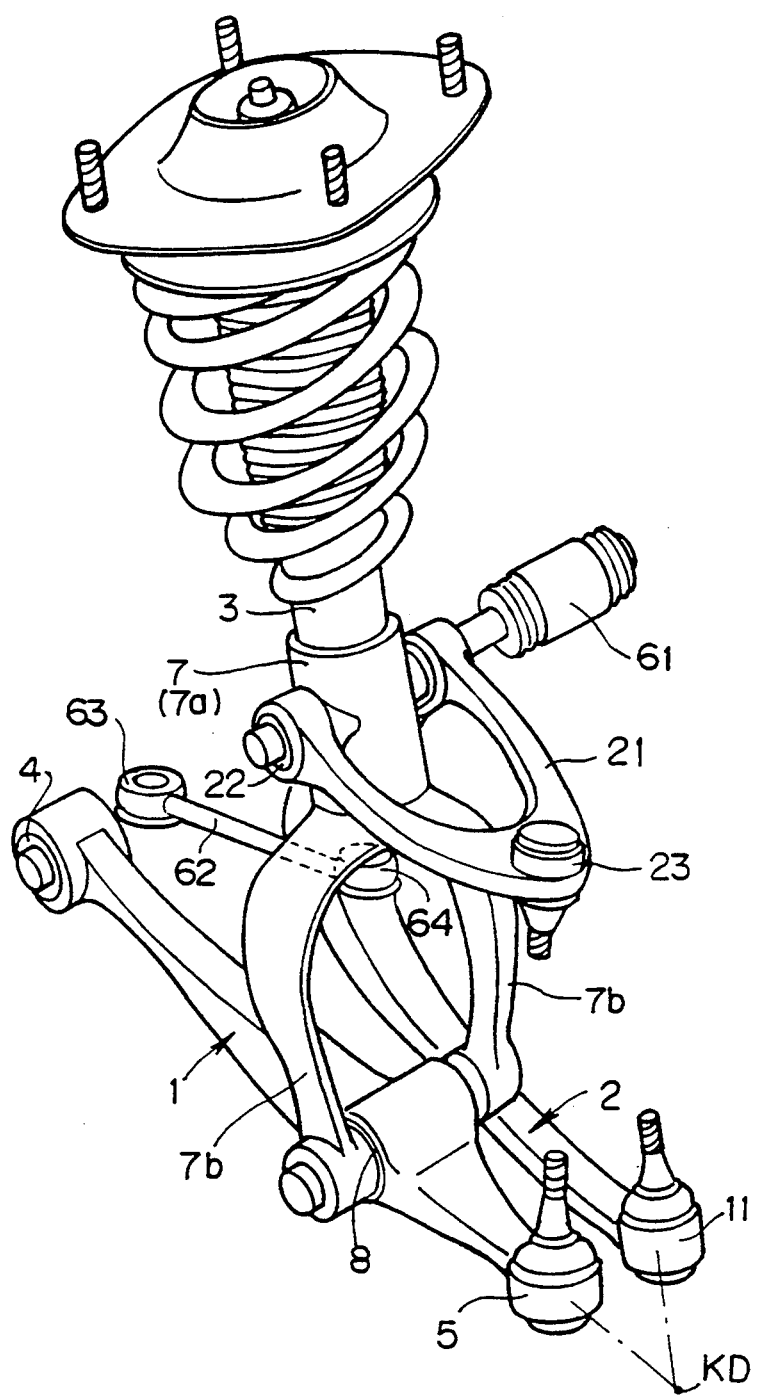
FIG. 11 is a perspective view showing an entire structure of the suspension apparatus in a third embodiment according to the present invention.

Second Embodiment (FIGS. 9–10)

FIGS. 9 and 10 are directed to a second embodiment of the suspension apparatus according to the present invention, in which the same elements are provided with the same reference numerals and symbols in the first embodiment of the present invention. FIG. 9 is a skeletal diagram which corresponds to FIG. 2.

In the second embodiment, the transversely inner end portion of the front lower arm 1 is mounted through a slidable bush 51 to the body of the vehicle so as to be slidable in longitudinal directions of the body, or in forward and rearward directions thereof, while the transversely inner end portion of the rear lower arm 2 is mounted to the body of the vehicle through a sublink 52 corresponding to the sublink 15 in the first embodiment.

In other words, the sublink 52 is mounted to the body at its generally middle portion through a bush 53 so as to be pivotable in a generally horizontal direction, and the transversely inner end portion of the rear lower arm 2 is mounted to the transversely outer end portion of the sublink 52 through a ball joint 54.

Further, the transversely inner end portion of the sublink 52 is mounted to the front lower arm 1 in the vicinity of the bush 51 through a connecting link 55 corresponding to the connecting link 25 in the first embodiment. In the drawings, reference numerals 56 and 57 denote ball joints for mounting the connecting links.

It can be noted herein that, in the second embodiment, the sublink 52 is caused to pivot in the counterclockwise direction in FIG. 9 because the length of the rear lower arm 2 is constant, when the transversely outer end portion of the rear lower arm 2 is to be displaced rearward, the rear lower arm 2 acting for the wheel which is to be located at the externally cornering side during steering. As a result, the transversely inner end portion of the front lower arm 1 is caused to be pulled rearward through the connecting link 55.

In the second embodiment, likewise in the first embodiment, the lower set point KD of the virtual kingpin axis KP is regulated from being displaced rearward, thereby suppressing the return of the steering wheel from worsening. In this case, the transversely inner end portion of the rear lower arm 2 is caused to be displaced forward to some extent to thereby make the castor trail smaller; however, the decrease in the castor trail can be suppressed to a sufficient extent by the rearward displacement of the transversely inner end portion of the front lower arm 1.

As shown in FIG. 10, the bush 51 comprises an outer cylinder 41, a middle cylinder 42, an inner cylinder 43 having a longer length, and an elastic member 44, such as rubbery material, interposed between the outer cylinder 41 and the middle cylinder 42. The outer cylinder 41 is integrally engaged with the transversely inner end portion of the front lower arm 1.

The clearance between the middle cylinder 42 and the inner cylinder 43 is disposed to be so larger to some extent that the middle cylinder 42 and the inner cylinder 43 are allowed to pivot about their respective axes and that they can relatively be displaced in their axial directions, that is, in the longitudinal direction of the body, to a considerable extent.

The inner cylinder 43 is fixed to a mounting shaft 47 with a nut 45 in a state in which the mounting shaft 47 fixed to the body of the vehicle is inserted in the inner cylinder 43. In other words, a flange 47a formed on the mounting shaft 47 is seated on an one end surface of the inner cylinder 43, and a washer 46 is engaged with the mounting shaft 47 projecting from the other end surface of the inner cylinder 43 in the state in which the flange 47a is seated on the inner cylinder 43. In this state, a nut 45 is screwed with the washer 46 to thereby fix the inner cylinder 43 in such a state that the inner cylinder 43 is axially clamped between the washer 46 and the flange 47a.

A member having a low friction coefficient, such as a member made of Teflon material or coated therewith, may be interposed between the middle cylinder 42 and the inner cylinder 43 in order to allow a smooth relative displacement of the middle cylinder 42 and the inner cylinder 43.

Third Embodiment (FIGS. 11–15

FIGS. 11–15 are directed to the third embodiment of the suspension apparatus according to the present invention, in which the same elements are provided with the same reference numerals and symbols. The third embodiment can suppress the amount of the castor trail from decreasing by making the rearward displacement of the transversely inner end portion of the rear lower arm 2 for the wheel to be located at the outer side of the body of the vehicle when the steering wheel is steered.

In the third embodiment, the front lower arm 1 is disposed extending in a generally transversely horizontal direction, and the transversely inner end portion of the front lower arm 1 is mounted through the bush 4 to the body of the vehicle to be pivotable about the pivotal axis parallel to the longitudinal direction of the body. On the other hand, the transversely inner end portion of the rear lower arm 2 is mounted through the slidable bush 61 to the body of the vehicle so as to be capable of being displaced in the longitudinal direction of the body. The slidable bush 61 may be the same as the slidable bush 10 in FIG. 10, and a duplicate description is omitted.

Figure 12:
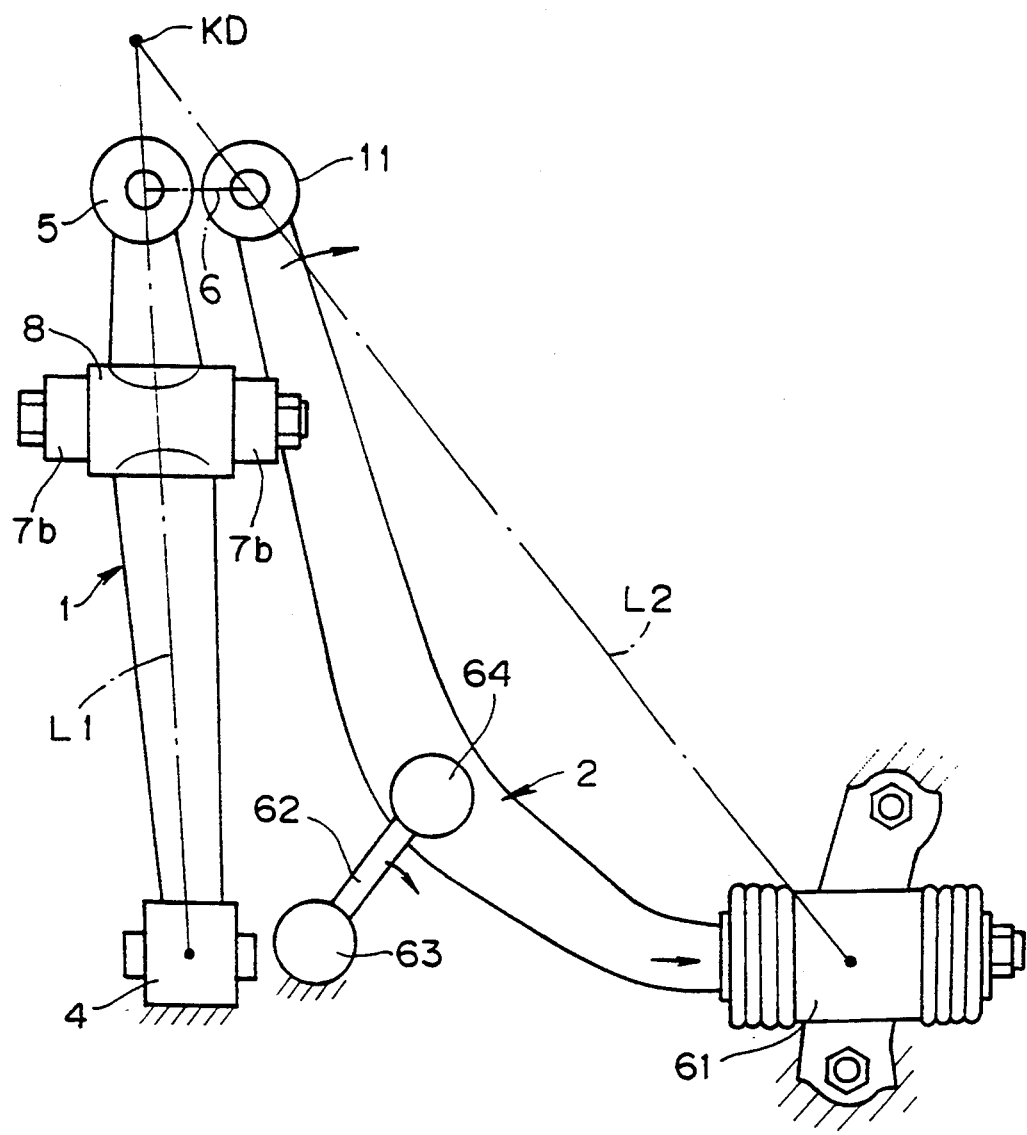
FIG. 12 is a plan view showing a front lower arm portion and a rear lower arm portion of FIG. 11.
Figure 13:
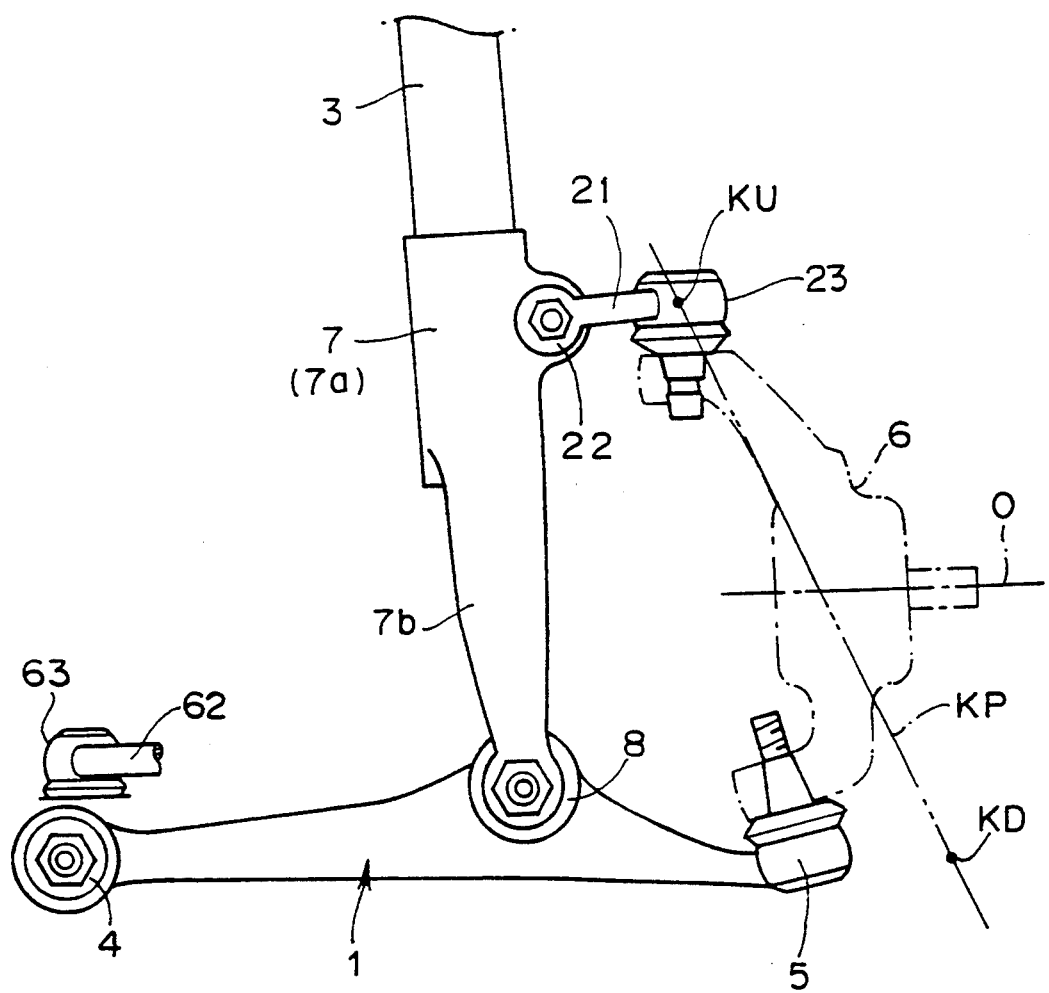
FIG. 13 is a rear view showing the lower arm portion of FIG. 11, when viewed from behind.
Figure 14:
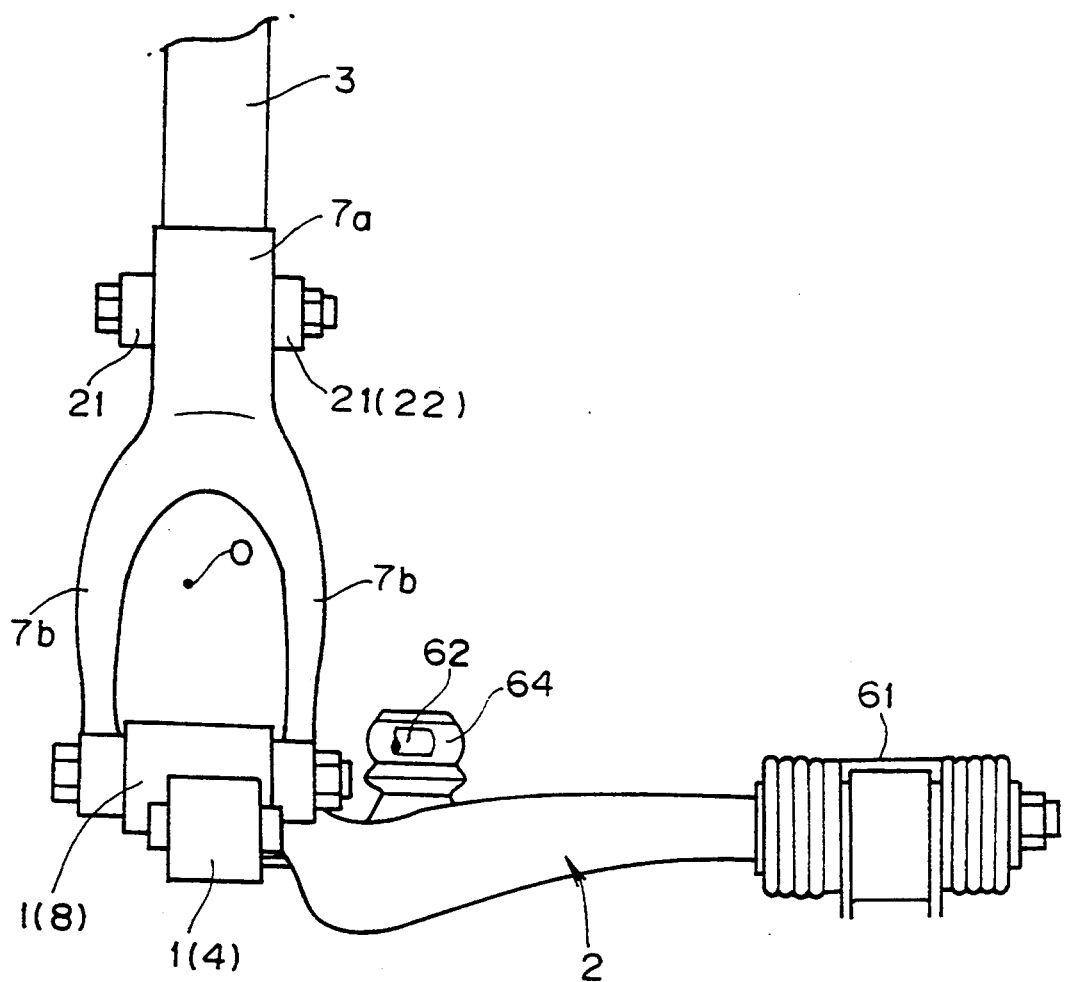
FIG. 14 is a side view showing the front lower arm portion and the rear lower arm portion of FIG. 11, when viewed from the inside of the body.

As shown in FIG. 12 corresponding to FIG. 2, a phantom line connecting the center of the bush 4 to the center of the ball joint 5 can be indicated by reference symbol L1, and a phantom line connecting the center of the slidable bush 61 to the center of the ball joint 11 can be indicated by reference symbol L2.

Further, the middle portion of the rear lower arm 2 is mounted to the body of the vehicle through a sublink 62 as a control link. In other words, one end portion of the sublink 62 is connected to the body through a ball joint 63, while the other end portion of the sublink 61 is connected to the middle portion of the rear lower arm 2 through a ball joint 64. The ball joint 63 at the side of the body is located in the position immediately close to the bush 4 interposed between the bush 4 and the bush 61, and the bush 4 is set in the position as substantially high substantially as the bush 11. The sublink 62 is disposed extending in a generally horizontal direction and inclining in the rearward direction as it extends toward the transversely outer side.

In addition, when the ball joint 11 for the rear lower arm 2 is displaced rearward, the sublink 62 can transmit the force to press the transversely inner end portion of the rear lower arm 2 in the rearward direction; however, the position of connection between the ball joints 63 and 64 is selected so as to allow an effective transmission of the force. More specifically, when the wheel is steered, the lower arms 1 and 2 for the wheel to be located at the externally cornering side of the body are arranged so as to pivot rearward about the respective transversely inner end portions thereof. As a result of the regulation of the distance between the ball joints 63 and 64 by the sublink 62, however, the transversely inner end portion of the rear lower arm 2 is allowed to be displaced rearward while the transversely outer end portion thereof is also displaced rearward.

Figure 15:
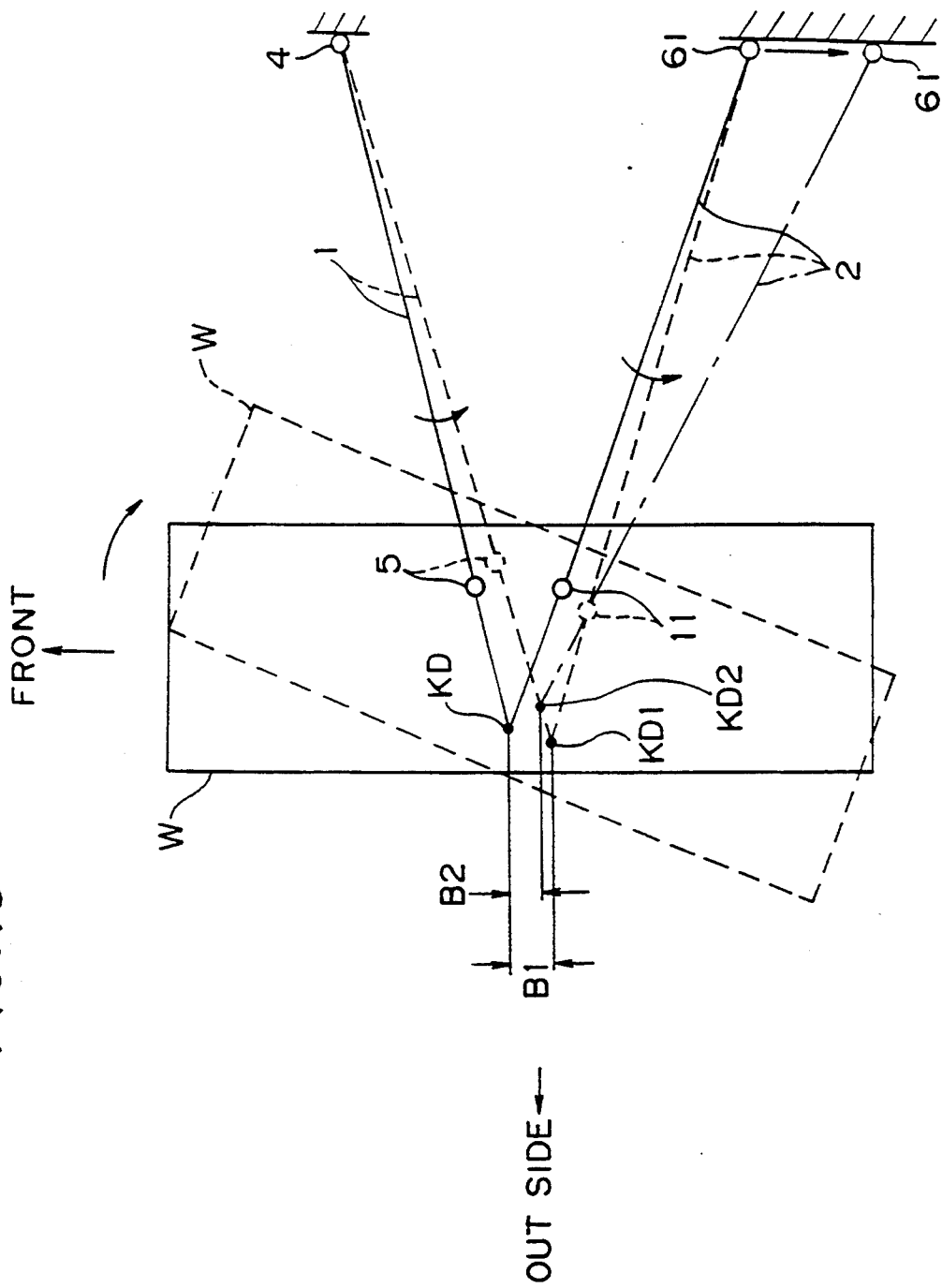
FIG. 15 is a schematic representation for describing the action by the suspension apparatus in the third embodiment according to the present invention, as compared with the action by the conventional suspension apparatus.

The action of the suspension apparatus in the third embodiment according to the present invention is shown diagrammatically in FIG. 15 corresponding to Fig. 8. In FIG. 15, the straight forward state is indicated by solid line, and the conventional instances at the time of cornering are indicated by broken line. In the instances of the present invention wherein the sublink 62 is provided and the transversely inner end portion of the rear lower arm 2 is allowed to be displaced in the forward and rearward directions of the body of the vehicle, the rear lower arm 2 for the wheel W at the externally cornering side during steering is disposed in such a manner as is indicated by dot-and-dash line. More specifically, when the transversely inner end portion of the rear lower arm 2 is displaced rearward, the lower set point of the virtual kingpin axis can be indicated by reference symbol KD2 that is displaced rearward by B2 from the original lower set point KD. The amount of displacement, as indicated by B2, is set to be smaller than the amount of displacement, as indicated by B1 (B2 < B1). In other words, the suspension apparatus in the third embodiment according to the present invention can reduce the castor trail to a small extent, thereby suppressing the return of the steering wheel from worsening, when it is steered.

It can further be noted that the use of the slidable bush 61 can simplify the structure of the portion of connection between the body of the vehicle and the rear lower arm 2.

Figure 16:
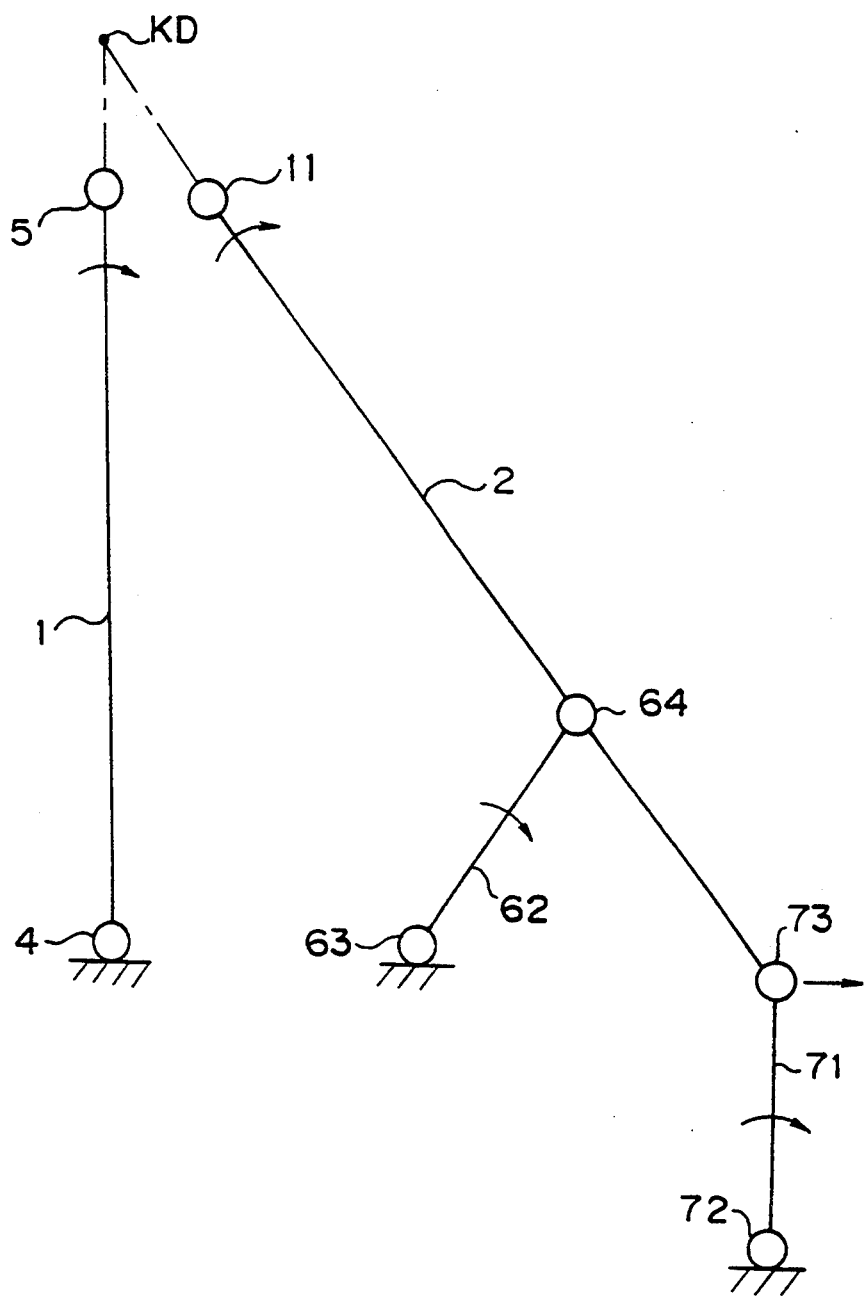
FIG. 16 is a skeletal view showing the suspension apparatus in a fourth embodiment according to the present invention, corresponding to FIG. 12.
Figure 17:
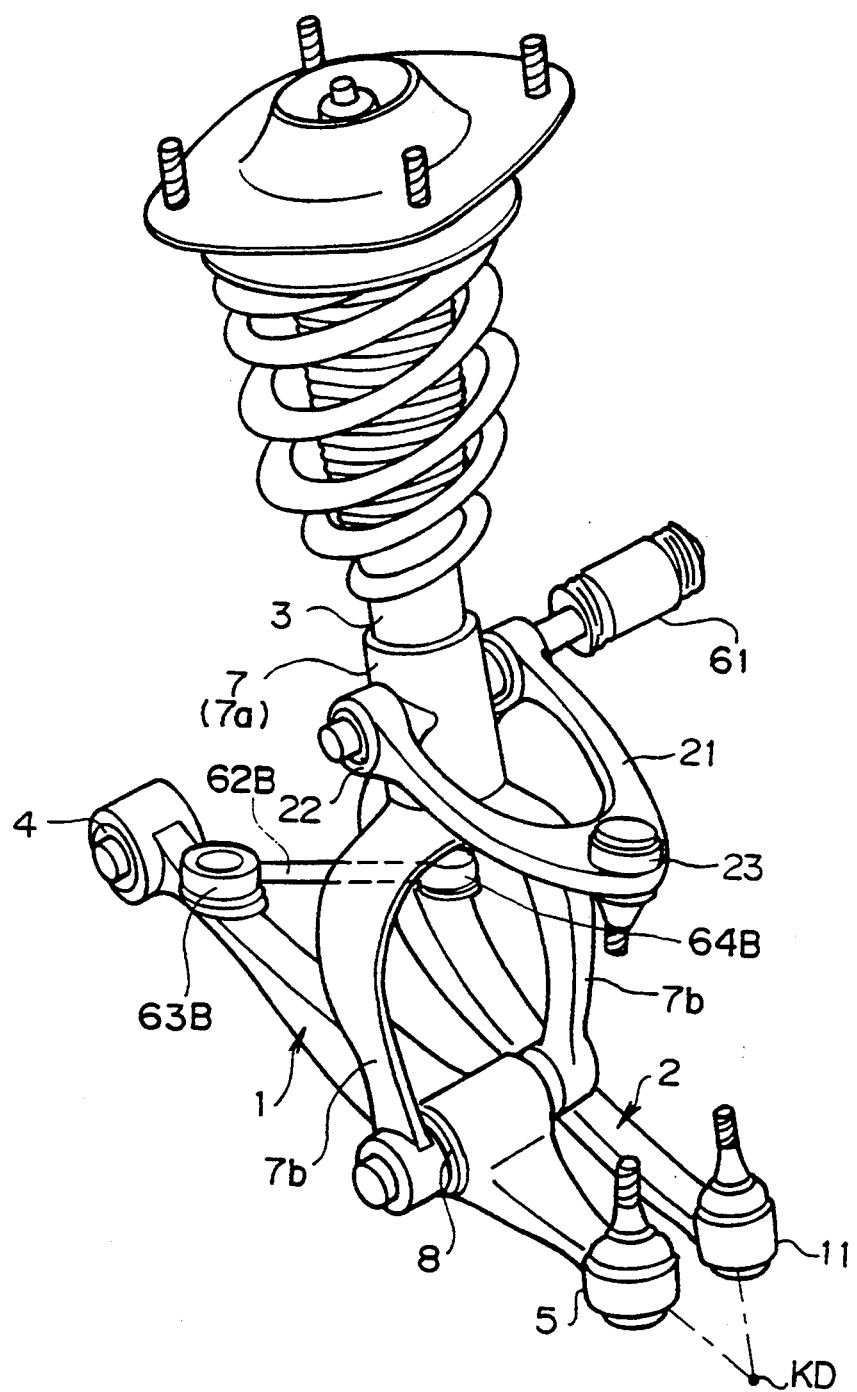
FIG. 17 is a perspective view showing an entire structure of the suspension apparatus in a fifth embodiment according to the present invention.
Figure 18:
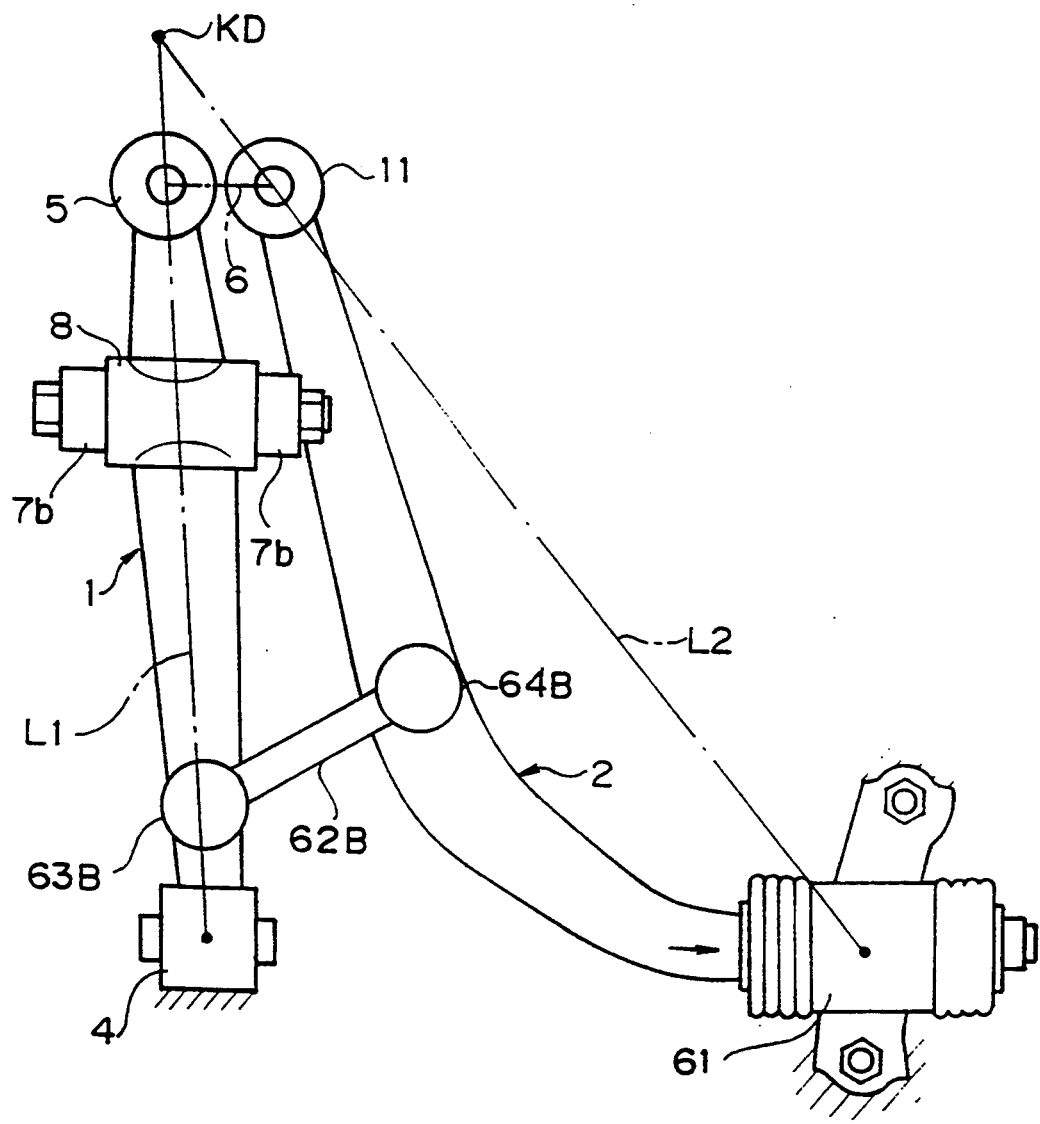
FIG. 18 is a plan view showing the front lower arm portion and the rear lower arm portion of FIG. 17.
Figure 19:
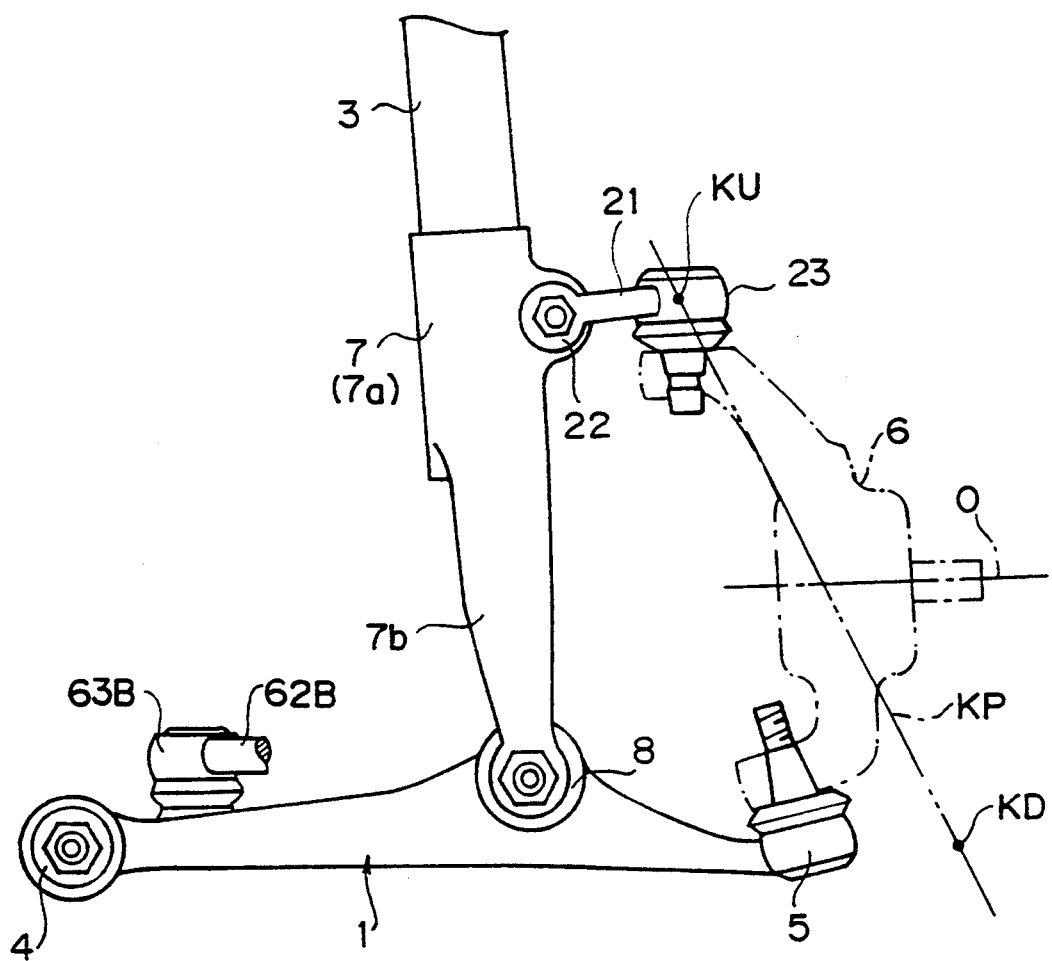
FIG. 19 is a rear view showing the lower arm portion of FIG. 17, when viewed from the behind.
Figure 20:
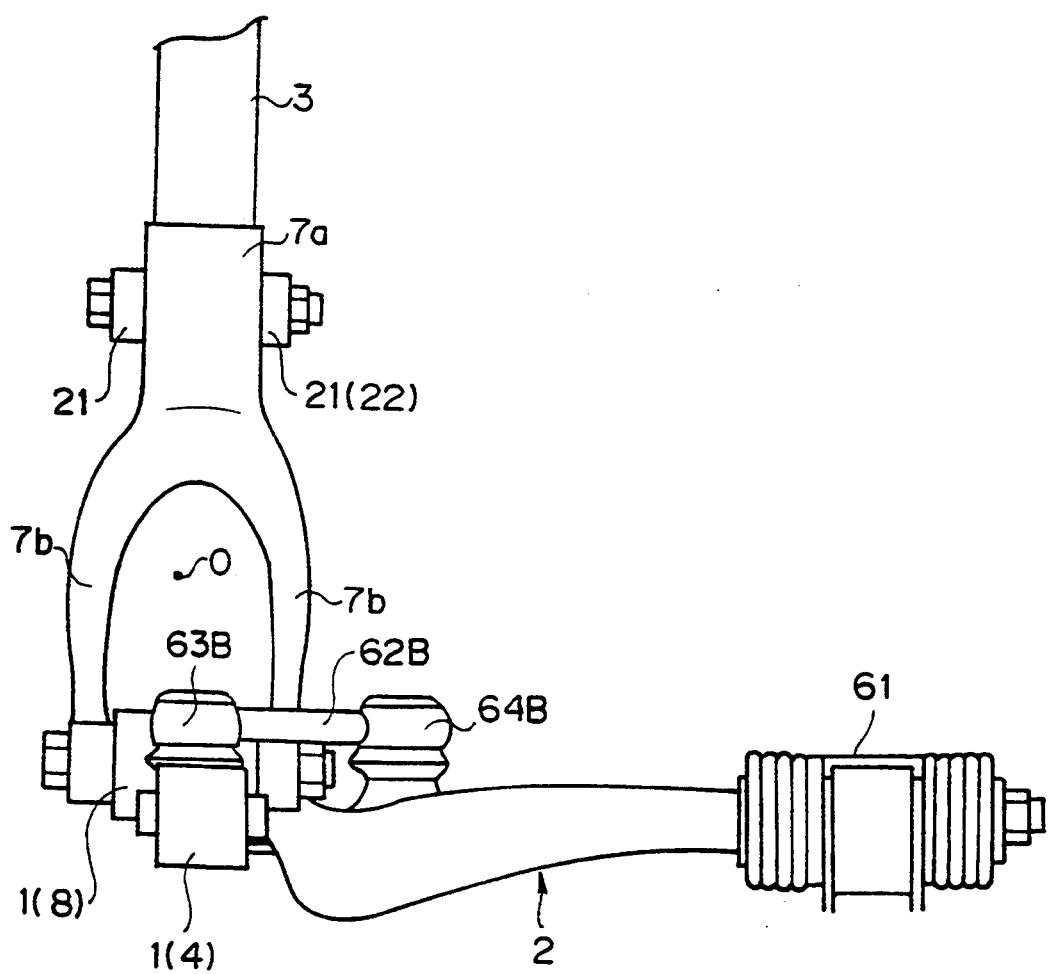
FIG. 20 is a side view showing the front lower arm portion and the rear lower arm portion of FIG. 17, when viewed from the inside of the body.

Fourth Embodiment (FIG. 16)

FIG. 16 is directed to a fourth embodiment of the suspension apparatus according to the present invention, in which the same elements are provided with the same reference numerals and symbols in the first embodiment of the present invention. FIG. 16 is a skeletal diagram which corresponds to FIG. 12.

The fourth embodiment is different from the third embodiment merely in the structure in which the rear lower arm 2 is mounted to the body of the vehicle. More specifically, in the fourth embodiment, an assist link 71 is separately provided extending in a generally transverse direction, and the transversely inner end portion of the assist link 71 is connected through a bush 72 to the body so as to be pivotable in the forward and rearward directions of the body. The transversely inner end portion of the rear lower arm 2 is connected through a coupling 73 to the transversely outer end portion of the assist link 71 so as to be pivotable about the axis extending in a generally vertical direction.

As shown in FIG. 16, when the wheel is steered, the transversely inner end portion of the rear lower arm 2 is displaced rearward by the rearward pivotal movement of the assist link 71 for the externally cornering wheel, thereby suppressing the lower set point of the virtual kingpin axis from being displaced rearward. It can be noted herein that the use of the assist link 71 can smoothly displace the rear lower arm 2 rearward.

Fifth Embodiment (FIGS. 17–20)

FIGS. 17–20 are directed to a fifth embodiment of the suspension apparatus according to the present invention, in which the structure of the suspension apparatus is substantially the same as that of the suspension apparatus as described in the third embodiment (FIGS. 11–15), with the exception that a connecting link 62B, functioning as a control link, corresponding to the sublink 62, is arranged to connect the front lower arm 1 to the rear lower arm 2.

As shown in FIGS. 17 to 20, the connecting link 62B is connected at its one end portion through a ball joint 63B to the front lower arm 1 in the position close to the transversely inner end portion thereof. On the other hand, the other end portion of the connecting link 62B is connected through a ball joint 64B to a generally middle portion of the rear lower arm 2.

The connecting link 62B can transmit the rearward pivotal movement of the front lower arm 1 about the bush 4 as force for pressing the transversely inner end portion of the rear lower arm 2 in the rearward direction; hence, the position of connection between the front lower arm 1 and the rear lower arm 2 is selected so as to allow an effective transmission of such force.

The action of the suspension apparatus in the fifth embodiment according to the present invention can be shown diagrammatically in the same manner as in FIG. 15 for the third embodiment. More specifically, in the present invention in which the connecting link 62B is provided and the transversely inner end portion of the rear lower arm 2 is so arranged as to be capable of being displaced in the forward and rearward directions of the body of the vehicle, the rear lower arm 2 for the wheel W at the externally cornering side during steering is disposed in such a manner as is indicated by dot-and-dash line in FIG. 15. More specifically, when the transversely inner end portion of the rear lower arm 2 is displaced rearward, the lower set point of the virtual kingpin axis can be indicated by reference symbol KD2 that is displaced rearward by B2 from the original lower set point KD. The amount of displacement, as indicated by B2, is set to be smaller than the amount of displacement, as indicated by B1 (B2<B1). In other words, the suspension apparatus in the third embodiment according to the present invention can reduce the castor trail to a small extent, thereby suppressing the return of the steering wheel from worsening when it is steered.

Figure 21:
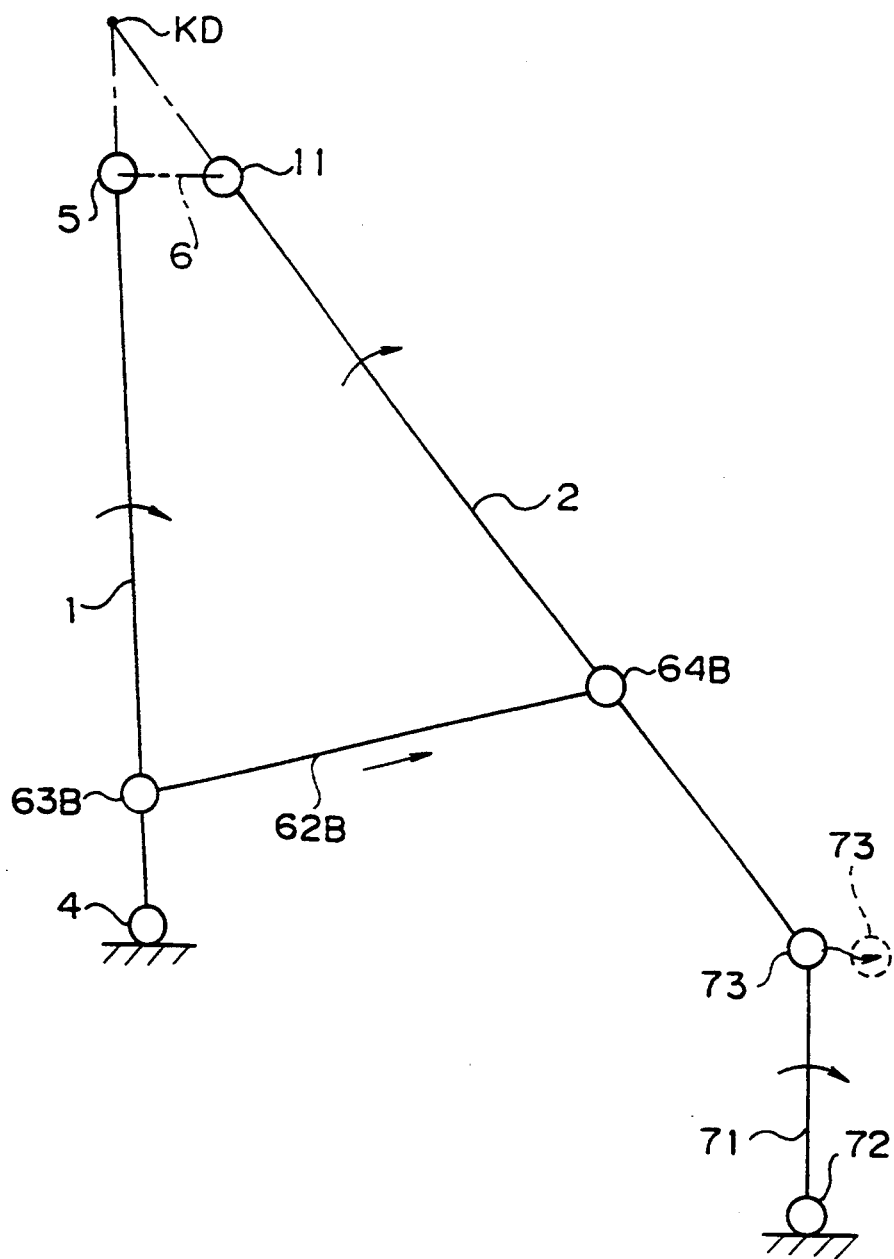
FIG. 21 is a skeletal view showing the suspension apparatus in a sixth embodiment according to the present invention, corresponding to FIG. 18.

Sixth Embodiment (FIG. 21)

FIG. 21 is directed to a sixth embodiment of the suspension apparatus according to the present invention, in which the structure of the suspension apparatus is substantially the same as that as in the fifth embodiment, with he exception that the structure of mounting the rear lower arm 2 to the body of the vehicle is different from the fifth embodiment by using members 71 to 73 in place of the slidable bush. FIG. 21 is a skeletal diagram which corresponds to FIG. 18.

The foregoing description is directed to the embodiments of the suspension apparatus according to the present invention; however, it is to be understood as a matter of course that various variations and modifications are interpreted as being contained and encompassed in the scope and spirit of the present invention.

For instance, the suspension apparatus according to the present invention can likewise be applied as a suspension for rear wheels, in particular for exclusive use with a so-called 4WS car in which the rear wheels are steered.

Further, although the foregoing embodiments are directed to a so-called negative camber in which the scrub radius becomes negative, they can likewise be applied to an 0 scrub or a positive camber.

In addition, they can be applied to a suspension for wheels, which follow, and for the driving wheels as well.

What is claimed is:

1. A suspension apparatus for an automotive vehicle having a member for supporting a steerable wheel mounted to a body of the vehicle through a front lower arm and a rear lower arm so as to be pivotable in a vertical direction and having a lower set point of a virtual kingpin axis constituted by an intersection of an extension of said front lower arm in an outer direction of the body with an extension of said rear lower arm in the outer direction thereof, wherein:

a transversely inner end portion of one lower arm of said front lower arm and said rear lower arm is connected to the body of the vehicle so as to be in a longitudinal direction of the body; and a control link is linked with an intermediate portion of at least one of said front lower arm and said rear lower arm and at least one of said body and one of said lower arms and is pivotable in the horizontal direction so as to convert a rearward displacement of at leat one of a transversely outer end portion of said front lower arm and a transversely outer end portion of said rear lower arm into an external force for displacing the transversely inner end portion of the one lowerr arm, said rearward displacement occuring at an externally cornering wheel when the wheel is steered.

2. A suspension apparatus as claimed in claim 1, wherein:

a transversely outer end portion of each of said front lower arm and said rear lower arm is connected separately to a wheel supporting member.

3. A suspension apparatus as claimed in claim 2, wherein the transversely inner end portion of said rear lower arm is mounted to the body of the vehicle through a slidable bush so as to be displaceable in the longitudinal direction of the body.

4. A suspension apparatus as claimed in claim 2, wherein:

an assist link extends in a generally transverse direction of the body and a transversely inner end portion of said assist link is mounted to the body of the vehicle so as to be pivotable in a generally horizontal direction; and the transversely inner end portion of said rear lower arm is connected to the transversely outer end portion of said assist link and the transversely inner end portion of said rear lower arm is displaced in the longitudinal direction of the body in accordance with pivotal movement about the transversely inner end portion of said assist link.

5. A suspension apparatus as claimed in claim 4, wherein a connecting portion between said assist link and said rear lower arm is located in a position toward a rear of the body from the connecting portion between said rear lower arm and said control link.

6. A suspension apparatus as claimed in claim 1, wherein:

said rear lower arm is said one lower arm and the transversely inner end portion of said rear lower arm is mounted to the body of the vehicle so as to be displaceable in the longitudinal direction of the body; and said control link is pivotally linked with each of said front lower arm and said rear lower arm.

7. A suspension apparatus as claimed in claim 6, wherein a transversely outer end portion of each of said front lower arm and said rear lower arm is connected separately to a wheel supporting member.

8. A suspension apparatus as claimed in claim 6, wherein the transversely inner end portion of said rear lower arm is mounted to the body of the vehicle so as to be displaceable in the longitudinal direction of the body through a slidable bush.

9. A suspension apparatus as claimed in claim 6, wherein said control link is inclined toward a rear of the body as it extends toward a transversely outer side of the body.

10. A suspension apparatus as claimed in claim 9, wherein:
a transversely inner end portion of said control link is connected to the middle portion of said front lower arm; and
a transversely outer end portion of said control link is connected to the middle portion of said rear lower arm.

11. A suspension apparatus as claimed in claim 10, wherein:
the transversely inner end portion of said control link is connected in a position close to the transversely inner end portion of said front lower arm through a ball joint; and
the transversely outer end portion of said control link is connected to the middle portion of said rear lower arm through a ball joint.

12. A suspension apparatus as claimed in claim 11, wherein the connecting portion between said control link and said rear lower arm is located in a transverse direction before the transversely inner end portion of said rear lower arm.

13. A suspension apparatus as claimed in claim 6, wherein:
an assist link extends in a generally transverse direction and a transversely inner end portion of said assist link is mounted to the body of the vehicle so as to be pivotable in a generally horizontal direction; and
the transversely inner end portion of said rear lower arm is connected to the transversely outer end portion of said assist link and the transversely inner end portion of said rear lower arm is displaced in the longitudinal direction of the body in accordance with pivotal movement about the transversely inner end portion of said assist link.

14. A suspension apparatus as claimed in claim 13, wherein a connecting portion between said assist link and said rear lower arm is located in a position toward a rear of the body from the connecting portion between said rear lower arm and said control link.

15. A suspension apparatus for an automotive vehicle having a member for supporting a steerable wheel mounted to a body of the vehicle through a front lower arm and a rear lower arm so as to be pivotable in a vertical direction and having a lower set point of a virtual kingpin axis constituted by an intersection of an extension of said front lower arm in an outer direction of the body with an extension of said rear lower arm in the outer direction thereof, wherein:
a transversely inner end portion of one lower arm of said front lower arm and said rear lower arm is connected to the body of the vehicle so as to be displaceable in a longitudinal direction of the body;
a control link is provided so as to convert a rearward displacement of at least one of a transversely outer end portion of said front lower arm and a transversely outer end portion of said rear lower arm into an external force for displacing the transversely inner end portion of the one lower arm, said rearward displacement occurring at an externally cornering wheel when the wheel is steered;
said front lower arm is said one lower arm and the transversely inner end portion of said front lower arm is connected to the body of the vehicle so as to be displaceable in the longitudinal direction;
said control link is connected to the body of the vehicle so as to be pivotable in a generally horizontal direction; and
said front lower arm is associated with said rear lower arm through said control link so that the transversely inner end portion of said front lower arm is displaceable rearward when a transversely inner end portion of said rear lower arm pivots rearward.

16. A suspension apparatus as claimed in claim 15, wherein said control link comprises a sublink mounted to the body of the vehicle so as to be pivotable and a connecting link connected to said sublink so as to be pivotable.

17. A suspension apparatus as claimed in claim 16, wherein:
the transversely inner end portion of said front lower arm is connected to said sublink through a ball joint; and
a middle portion of said rear lower arm is connected to said sublink through said connecting link.

18. A suspension apparatus as claimed in claim 17, wherein each of said sublink and said connecting link is inclined toward a rear of the body of the vehicle as it extends toward a transversely outer side of the body.

19. A suspension apparatus as claimed in claim 18, wherein:
a transversely inner end portion of said sublink is mounted to the body of the vehicle so as to be pivotable in a generally horizontal direction;
the transversely inner end portion of said front lower arm is mounted to a middle portion of said sublink through a ball joint;
a transversely inner end portion of said connecting link is mounted to the middle portion of said rear lower arm through a ball joint; and
a transversely inner end portion of said rear lower arm is located in a position inside a rear side of the body from the transversely outer end portion of said connecting link.

20. A suspension apparatus as claimed in claim 16, wherein:
the transversely inner end portion of said front lower arm is mounted to the body of the vehicle through a slidable bush;
the transversely inner end portion of said rear lower arm is mounted to said sublink through a ball joint; and
the middle portion of said front lower arm is connected to said sublink through said connecting link.

21. A suspension apparatus as claimed in claim 20, wherein:
said sublink is disposed extending in a generally transverse direction of the body and a middle portion of said sublink is mounted to the body of the vehicle so as to be pivotable in a generally horizontal direction;
the transversely inner end portion of said rear lower arm is mounted to the transversely outer end portion of said sublink through a ball joint; and
the transversely inner end portion of said sublink is connected to said front lower arm through said connecting link.

22. A suspension apparatus as claimed in claim 21, wherein a connecting portion between said front lower arm and said connecting link is located in a position close to said slidable bush.

23. A suspension apparatus as claimed in claim 15, wherein a transversely outer end portion of each of said front lower arm and said rear lower arm is connected separately to a wheel supporting member.

24. A suspension apparatus for an automotive vehicle having a member for supporting a steerable wheel mounted to a body of the vehicle through a front lower arm and a rear lower arm so as to be pivotable in a vertical direction and having a lower set point of a virtual kingpin axis constituted by an intersection of an extension of said front lower arm in an outer direction of the body with an extension of said rear lower arm in the outer direction thereof, wherein:

a transversely inner end portion of one lower arm of said front lower arm and said rear lower arm is connected to the body of the vehicle so as to be displaceable in a longitudinal direction of the body;

a control link is provided so as to convert a rearward displacement of at least one of a transversely outer end portion of said front lower arm and a transversely outer end portion of said rear lower arm into an external force for displacing the transversely inner end portion of the one lower arm, said rearward displacement occurring at an externally cornering wheel when the wheel is steered;

said rear lower arm is said one lower arm and the transversely inner end portion of said rear lower arm is mounted to the body of the vehicle so as to allow displacement in the longitudinal direction of the body; and said control link operatively connects said rear lower arm to the body of the vehicle.

25. A suspension apparatus as claimed in claim 24, wherein:

a one end portion of said control link is connected to a middle portion of said rear lower arm through a ball joint; and an other portion of said control link is connected to the body of the vehicle through a ball joint.

26. A suspension apparatus as claimed in claim 24, wherein said control link is inclined toward a rear of the body of the vehicle as it extends toward a transversely outer side of the body.

27. A suspension apparatus as claimed in claim 26, wherein:

a transversely inner end portion of said control link is located in a position outside a rear of the body of a vehicle from the transversely inner end portion of said front lower arm; and a transversely outer end portion of said control link is located in a transverse direction before the transversely inner end portion of said rear lower arm.

28. A suspension apparatus as claimed in claim 24, wherein a transversely outer end portion of each of said front lower arm and said rear lower arm is connected separately to a wheel supporting member.

29. A suspension apparatus as claimed in any one of claims 1, 3–6, 9–22 or 24–27 inclusive, wherein:

a lower end portion of a suspension damper is connected to said front lower arm; and said suspension damper is connected to said member for supporting the wheel through an upper arm.

30. A suspension apparatus as claimed in claim 29, wherein a length of said upper arm is sufficiently shorter than a length of each of said front lower arm and said rear lower arm.

31. A suspension apparatus as claimed in claim 29, wherein:

said suspension damper is mounted to the front lower arm through a mounting member having a pair of leg sections having an open distance extending in the longitudinal direction of the body; and a space is provided between said pair of the leg sections, a drive shaft penetrating through said pair of the leg section over the entire length of said space.

32. A suspension apparatus as claimed in claim 31, wherein said suspension apparatus is for a front wheel of a front wheel drive car.

* * * * *